(12) United States Patent
Malladi et al.

(10) Patent No.: US 7,996,032 B2
(45) Date of Patent: Aug. 9, 2011

(54) POWER CONTROL AND RESOURCE MANAGEMENT IN ORTHOGONAL WIRELESS SYSTEMS

(75) Inventors: Durga Prasad Malladi, San Diego, CA (US); Byoung-Hoon Kim, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 11/689,962

(22) Filed: Mar. 22, 2007

(65) Prior Publication Data

US 2007/0270175 A1 Nov. 22, 2007

Related U.S. Application Data

(60) Provisional application No. 60/786,464, filed on Mar. 27, 2006.

(51) Int. Cl.
*H04B 7/00* (2006.01)
(52) U.S. Cl. .......... 455/522; 455/453; 455/13.4; 455/69
(58) Field of Classification Search .................. 455/522, 455/69, 453, 550.1, 127.1, 127.2, 138, 405, 455/452.2, 135, 226.3, 454, 63, 450; 370/342, 370/286, 441, 335, 236, 329, 252
See application file for complete search history.

(56) References Cited

U.S. PATENT DOCUMENTS

| | | | | |
|---|---|---|---|---|
| 5,675,581 A | * | 10/1997 | Soliman | 370/252 |
| 2004/0252658 A1 | | 12/2004 | Hosein et al. | |
| 2005/0003827 A1 | * | 1/2005 | Whelan | 455/454 |
| 2005/0009551 A1 | * | 1/2005 | Tsai et al. | 455/522 |
| 2006/0088081 A1 | * | 4/2006 | Withington et al. | 375/130 |
| 2006/0166677 A1 | * | 7/2006 | Derakshan et al. | 455/453 |
| 2007/0019589 A1 | * | 1/2007 | Attar et al. | 370/335 |
| 2007/0040704 A1 | * | 2/2007 | Smee et al. | 340/981 |
| 2007/0070908 A1 | * | 3/2007 | Ghosh et al. | 370/236 |
| 2007/0147328 A1 | * | 6/2007 | Carlsson et al. | 370/342 |
| 2007/0147329 A1 | * | 6/2007 | Soriaga et al. | 370/342 |

FOREIGN PATENT DOCUMENTS

| WO | 01024568 | 4/2001 |
|---|---|---|
| WO | WO2006007318 A1 | 1/2006 |

OTHER PUBLICATIONS

International Search Report—PCT/US07/112416—International Search Authority, European Patent Office—Sep. 28, 2007.
Written Opinion—PCT/US07/112416—International Search Authority, European Patent Office—Sep. 28, 2007.

(Continued)

*Primary Examiner* — Tan Trinh
(74) *Attorney, Agent, or Firm* — Milan I. Patel; John J. Ketchum

(57) ABSTRACT

A method for controlling power in a wireless network is provided. The method includes determining a relative power parameter at a wireless device such as a mobile wireless terminal and receiving a load parameter at the wireless device, where the load parameter is associated with at least one other wireless cell. The method includes adjusting transmit power of the wireless device in view of the relative power parameter and the load parameter. In another embodiment, the transmit power can be controlled in view of an absolute power spectral density parameter.

42 Claims, 11 Drawing Sheets

OTHER PUBLICATIONS

International Preliminary Report on Patentability—PCT/US07/112416—The International Bureau of WIPO, Geneva, Switzerland—Sep. 30, 2008.

IEEE Standard 802.20, "MBFFDD and MBTDD: Proposed Draft Air Interface Specification", IEEE 802.20 Working Group on Mobile Broadband Wireless Access, pp. 1-772 (Jan. 6, 2006).

* cited by examiner

POWER CONTROL AND RESOURCE MANAGEMENT IN ORTHOGONAL WIRELESS SYSTEMS

This application claims the benefit of U.S. Provisional Patent Application Ser. No. 60/786,464, filed on Mar. 27, 2006, entitled "A Method of Power Control Algorithm for DFMA Systems" the entirety of which is incorporated herein by reference.

BACKGROUND

I. Field

The subject technology relates generally to communications systems and methods, and more particularly to systems and methods that employ power control components to mitigate interference between wireless cells and within a given cell.

II. Background

Wireless communications systems have been applied to almost every area of human interaction. From cell phones to text messaging systems, communications technology in this arena are constantly changing, improving, and evolving into other forms. One such technology includes the amount of digital data being employed such as Internet information that is now communicated to mobile wireless systems. Many systems currently deliver such digital information where there is a plurality of design standards to define how to deliver desired digital content to respective users. One such standard includes IEEE 802.20 that defines design guidelines for wireless systems that communicate various types of data.

In general, the guidelines set forth in 802.20 are intended as a specification for the PHY and MAC layers of an air interface for interoperable packet-data mobile broadband wireless access systems. Typically, such systems operate in licensed frequency bands below 3.5 GHz, support peak data rates per user in excess of 1 Mbps, support vehicular mobility classes up to 250 Km/h, and cover cell sizes commensurate with ubiquitous metropolitan area networks. This includes targeting spectral efficiencies that employ sustained user data rates with numbers of active users significantly higher than achieved by existing mobile systems.

Other features of 802.20 include the enablement for worldwide deployment of cost effective, spectrum efficient, always on and interoperable mobile broadband wireless access systems in order to address various user needs. These needs include mobile and ubiquitous Internet access, transparent support of Internet applications, access to enterprise intranet services, along with transparent access to infotainment and location services. Thus, the 802.20 specification fills the performance gap between high data-rate low mobility services currently developed in general 802 specifications and high mobility cellular networks.

The technical feasibility of 802.20 wireless systems has been demonstrated by proprietary systems currently in deployment and trial. These systems use technological components in wide deployment today, such as modems, radios, antennas and PHY/MAC protocols. These solutions may use well understood spread spectrum technologies (such as frequency hopping), radio technologies (such as OFDM), advanced signal processing techniques (such as adaptive antennas) and cellular architectures. Also, these technologies have been successfully tested and deployed over the past and are finding increased usage in the LAN/MAN and Cellular environments, for example. Commercial deployment of cellular wireless networks in bands licensed for mobile services demonstrates that air interface support for high reliability networks is in fact suitable for commercial deployment.

One area of interest with current design standards such as 802.20 relates to how a given wireless cell communicates to user equipment or terminals within its cell and how one wireless cell may impact on one or more other cells. This includes how to specify the amount of interference that may be caused by one or more wireless terminals in the cell and the impact these terminals may have on other terminals operating in adjacent cells. In general, it is desirable to control the amount of power generated in any one cell to mitigate interference in other cells that are within a given proximity and how the cells may be impacted. Also, terminals within any given cell may impact other terminals within the same cell since it may not be possible to have perfect orthogonality within the cell thus causing some leakage or interference within the cell. Currently, one method proposed by 802.20 involves controlling the amount of power that is transmitted within the cell. This method involves controlling the relative power spectral density from user equipment within the cells. A problem with this method is that there no feedback or communications to determine whether there is an impact from one cell or another. Also, in addition to relative power spectral density controls there may be more effective methods to control the amount of interference between cells and/or the potential for interference within a given cell.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for controlling uplink power in wireless network cells in order to mitigate interference between cells and/or interference within a given cell. Various methods employ parameters that are maintained and communicated between a base station (sometimes referred to as Node B) and one or more components/devices or user equipment that communicates with the base station and forms a respective cell. In general, cells operate with little knowledge that another cell may also be within proximity and thus be a potential for interference. Thus, the base stations operating a given cell may communicate some general status parameters including whether or not there are any devices currently communicating in the cell. Thus, one parameter that may be communicated between cells that indicates the general notion of load in the cell, where a load indicator may signal the interference experienced by the cell. From these and other parameters, interference can be mitigated between cells by employing the parameters to reduce transmit power at the respective devices operating within a given cell. By reducing transmit power in view of the determined parameters, the noise impact between cells can be mitigated as well as the impact by such factors as signal leakage between devices.

In an embodiment, a power control component employs the load indicator and another parameter such as power headroom, where such headroom can be a function of a reference signal plus the maximum deliverable power by a given terminal. Based on such parameters, power transmissions can be tailored at the transmitting device in the cell to reduce the impact on devices within the cells or devices associated with other cells. In another embodiment, a power density control component controls the power headroom parameter (or relative transmit power capability) along with a parameter referred to as absolute power spectral density at the device. Based on this combination of power headroom and/or absolute power spectral density, devices operating in a given cell can adjust a given transmit power output in order to mitigate interference in a wireless network.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided for mitigating interference in a wireless network by controlling transmitter power levels in the network. In one embodiment, a method for controlling power in a wireless network is provided. The method includes determining a relative power parameter at a wireless device such as a mobile wireless terminal and receiving a load parameter at the wireless device, where the load parameter is associated with at least one other wireless cell. The method includes adjusting transmit power of the wireless device in view of the relative power parameter and the load parameter. In another embodiment, the transmit power can be controlled in view of an absolute power spectral density parameter. In still yet another embodiment, along with relative power and absolute power spectral density parameters, transmit power can be adjusted in view of a relative power spectral density parameter.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
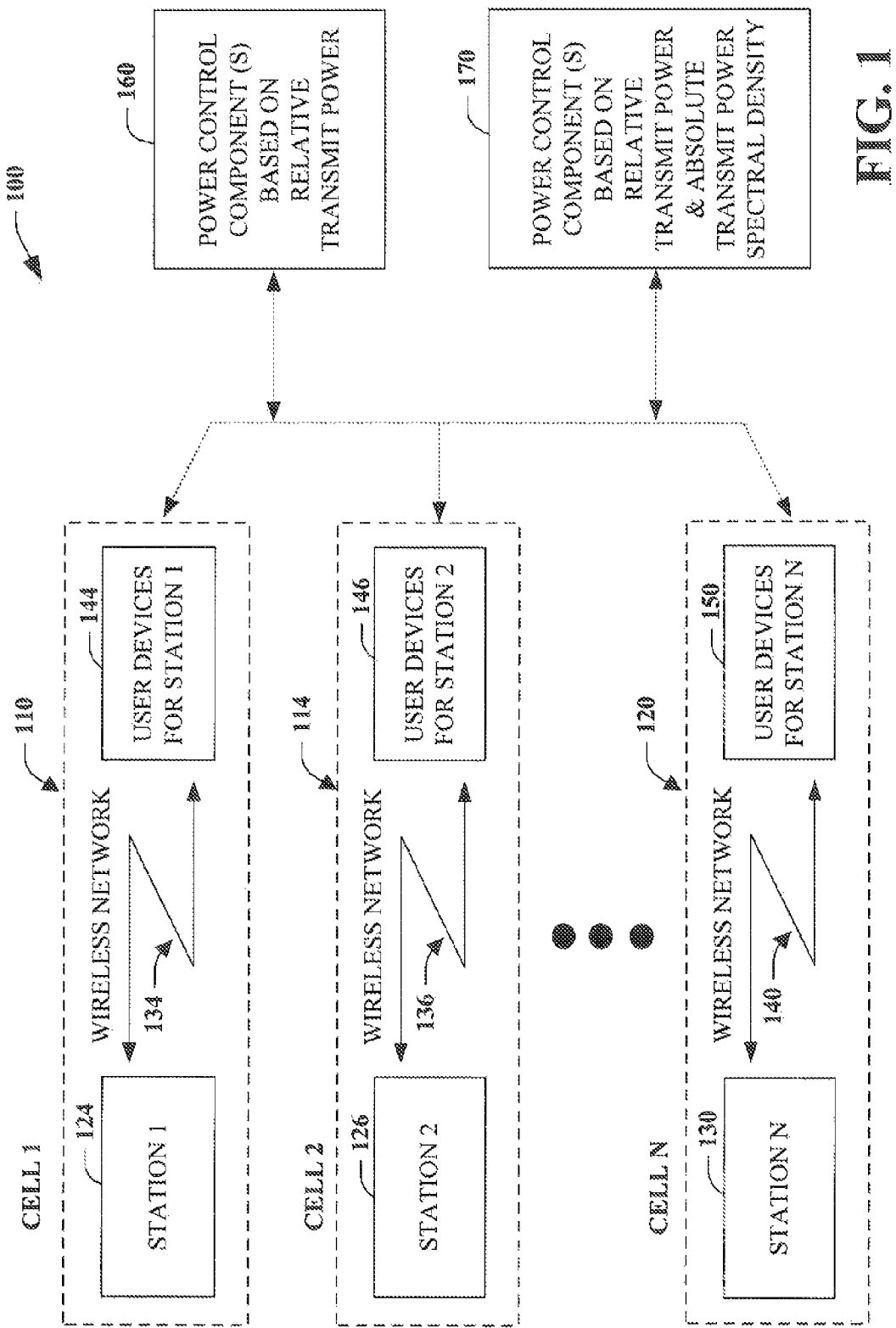
FIG. 1 is a schematic block diagram illustrating power control components for a wireless network.

FIG. 1 illustrates a wireless network system 100 having control components for mitigating interference within the system. The system 100 includes a plurality of cells illustrated at reference numerals 110 through 120, where each of the respective cells include a station (reference numerals 124 through 130) that communicates over wireless networks (reference numerals 134 through 140) to one or more user devices (reference numerals 144 through 150) within the respective cells. The user devices 144-150 can include substantially any type of wireless communicating device such as a cell phone, computer, personal assistant, hand held or laptop devices, and so forth.

In one embodiment, a power control component 160 (or components) is provided to control power of the user devices 144-150, wherein such control is based upon a relative transmit power of the devices. In another embodiment, a power control component 170 is provided to control power as a function of relative device power and an absolute power spectral density parameter associated with the devices. The power control components 160 and 170 can be executed as an algorithm, for example, that is shared across stations 124 through 130 and user devices 144-150. For example, the station 124 may employ all or portions of components 160 and/or 170 with user devices 144, whereas the station 126 may employ all or portions of components 160 and/or 170 with user devices 146. In general, the user devices 144-150 (or terminals) report a set of parameters along with a request for data transmission within the respective cells 110-120. Thus, a respective serving cell 110-120 controls a change in a user device's 144-150 relative transmit power and/or the absolute value of the user device's absolute power spectral density, while other cells 110-120 impact the change in the device transmit power by communicating information on cell load as is described in more detail below.

Generally, the power control components 160 and 170 allow for controlling uplink power in the cells 110-120 in order to mitigate interference between cells and/or interference within a given cell. Various processes employ parameters that are maintained and communicated between the stations 124-130 (sometimes referred to as Node B) and associated user devices 144-150. In general, cells 110-120 operate with little knowledge that another cell may also be within proximity and thus be a potential for interference. Thus, the stations 124-130 operating a given cell 110-120 may communicate some general status parameters including whether or not there are any devices 144-150 currently communicating in the given cell. Thus, one parameter that may be communicated between cells 110-120 indicates the general notion of load in the cell, where a load indicator bit for example, may signal that at least one device 144-150 is communicating in the cell. From these and other parameters, interference can be mitigated between cells 110-120 by employing the parameters to reduce transmit power at the respective devices 144-150 operating within a given cell. By reducing transmit power in view of the determined parameters, the impact between cells 110-120 can be mitigated as well as the impact by such factors as signal leakage between devices operating within a given cell.

In an embodiment, the power control component 160 employs the load indicator bits noted above and another parameter such as power headroom, where such headroom can be a function of a reference signal maintained at the stations 124-130 plus the maximum deliverable power by given devices 144-150. Based on such parameters, power transmissions can be tailored at the transmitting device 144-150 in the cell 124-130 to reduce the impact on devices within the cells or devices associated with other cells. In another embodiment, the power density control component 170 controls the power headroom parameter (or relative transmit power capability) along with a parameter referred to as absolute power spectral density at the devices 144-150. Based on this combination of power headroom and absolute power spectral density, devices 144-150 operating in a given cell 124-130 can adjust a given transmit power output in order to mitigate interference.

It is noted that the power control components 160 and power spectral density control components 170 can be combined with existing methods to control power in a given cell 110-120. For example, one existing method employs a relative power spectral density parameter to control power in a given cell. Such relative power spectral density parameters can be employed with the headroom parameters and the absolute power spectral density parameters to further mitigate interference within or across cells 110-120. These concepts will be described in more detail below, where FIG. 2 illustrates a method that controls relative device power, FIG. 3 illustrates a method that controls absolute power spectral density and relative device power, and FIG. 4 shows an existing method that controls relative power spectral density, where FIG. 5 illustrates control combinations that can be utilized from the methods depicted in FIGS. 2-4.

Before proceeding, one or more of the following considerations may be applied when applying the power control components 160 and/or 170. As noted above, the components 160 or 170 can be provided as a power control algorithm for frequency division multiple access (FDMA) systems, for example. Generally, these components 160 and 170 are employed to reduce inter-cell interference and provide scheduler flexibility within cells to allocate bandwidth to different users, where the scheduler is employed at the stations 124-130 to determine how much bandwidth is available for a given user. In one example application of the components 160 and 170, the following assumptions may be utilized: Typically, each device 144-150 has a single serving cell 110-120 in the uplink channel. The serving cell 110-130 is typically not aware of interference caused by the transmission from its devices 144-150 to other cells. Generally, each cell broadcasts an uplink load indicator (e.g., bit signaling busy or not) in the downlink channel to a respective user device 144-150 in a periodic manner. Also, in general, each device 144-150 decodes load indicator bits from all cells 110-120 in its candidate set and reduces its transmit power and/or power spectral density (PSD) accordingly.

Figure 2:
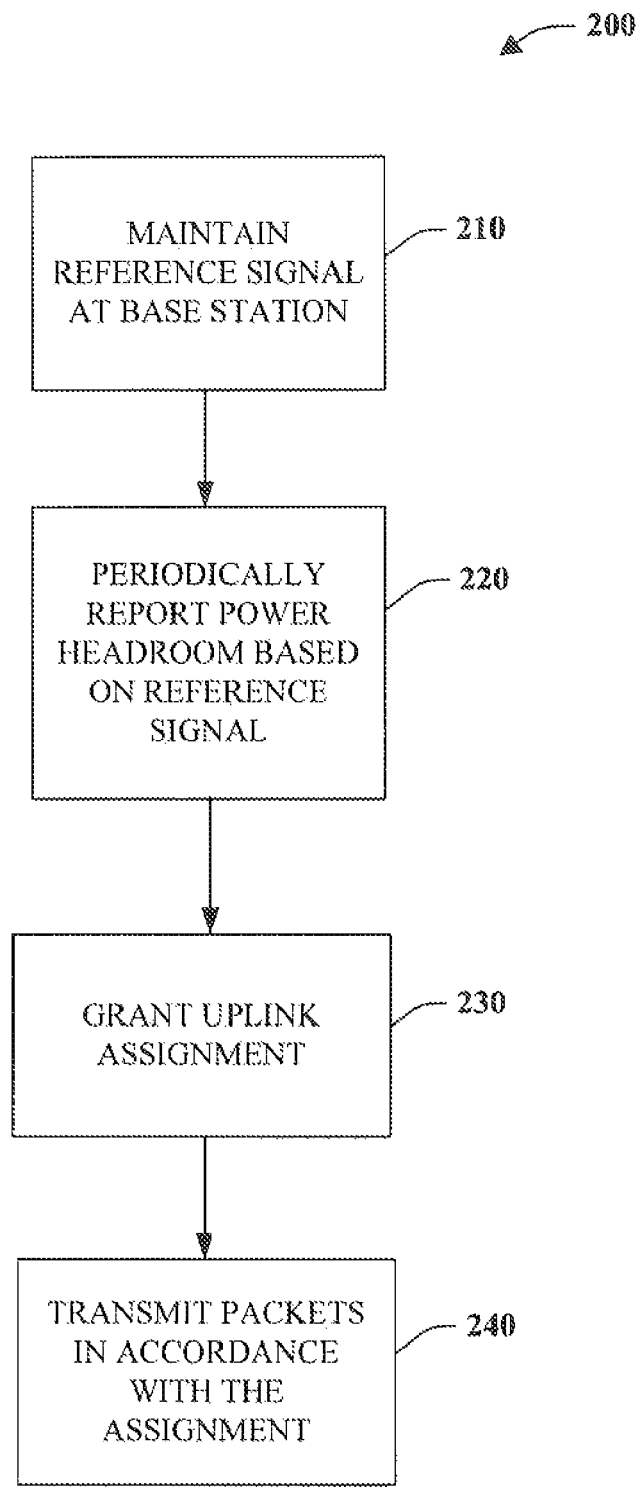
FIG. 2 is a flow diagram illustrating a relative power control process.
Figure 3:
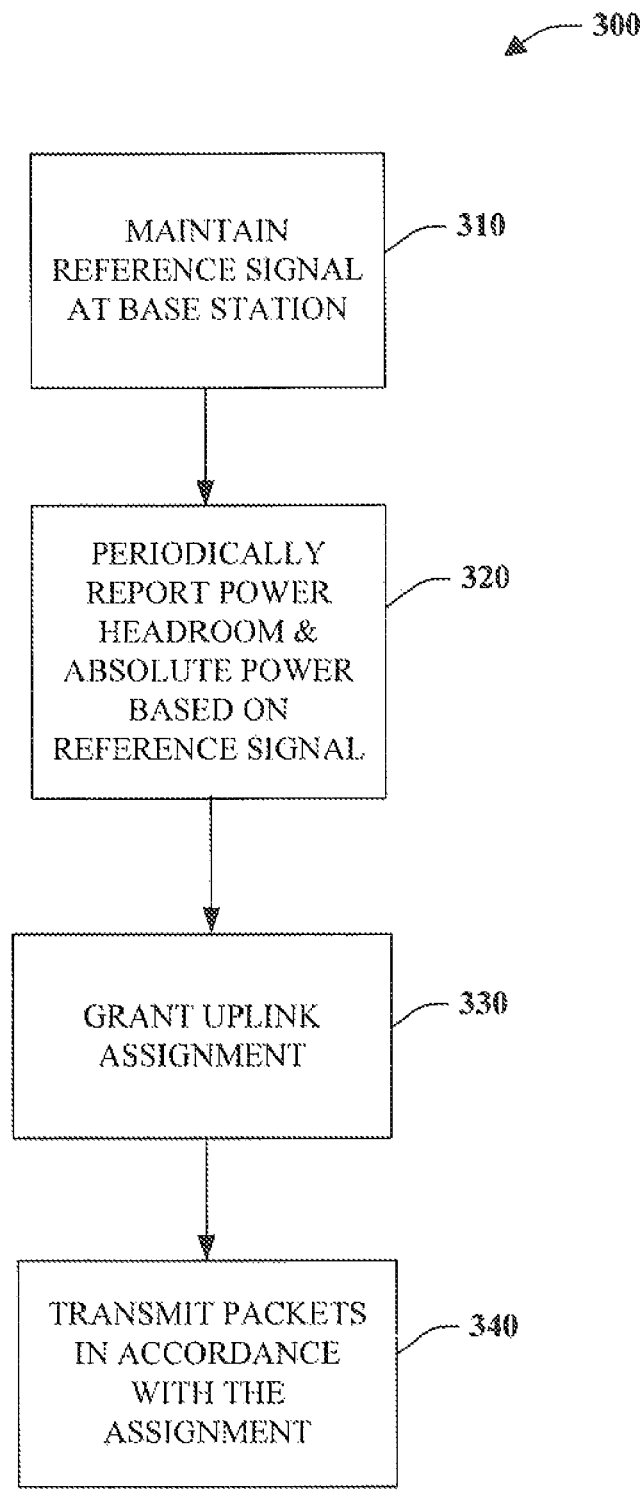
FIG. 3 is a flow diagram illustrating a relative power control process having an absolute power spectral density control.
Figure 4:
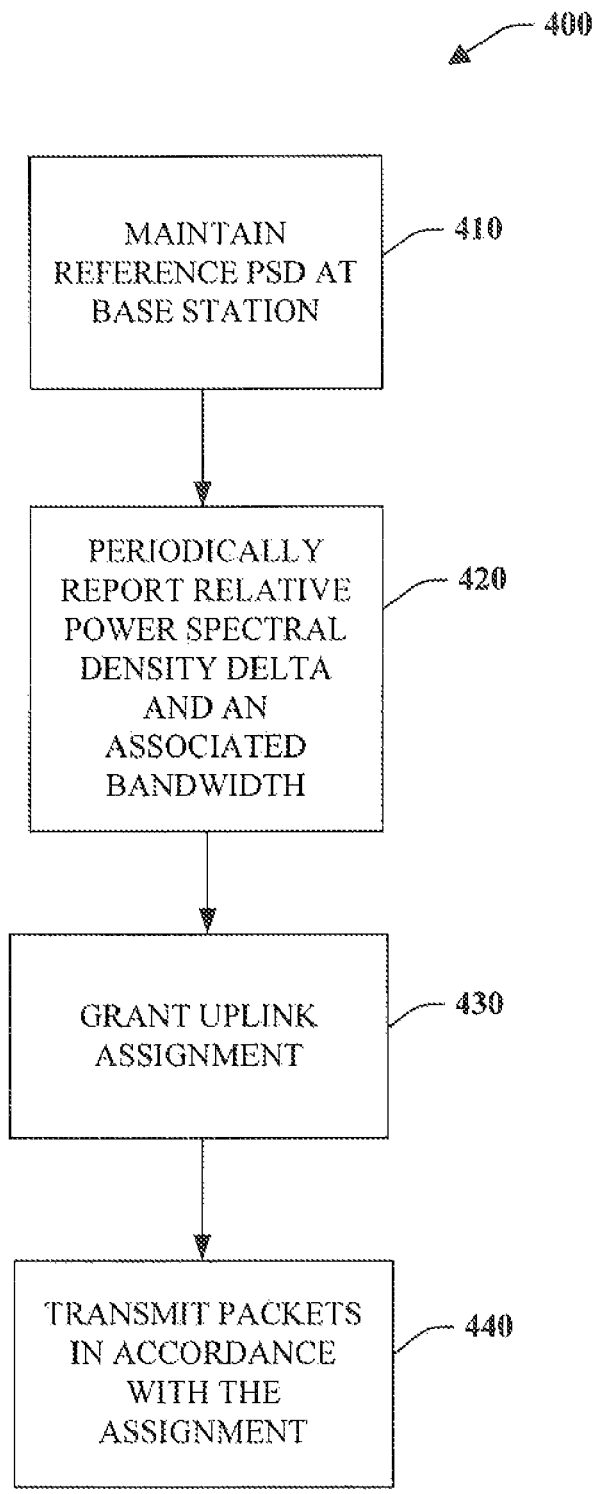
FIG. 4 is a diagram illustrating a relative power spectral density control process.
Figure 5:
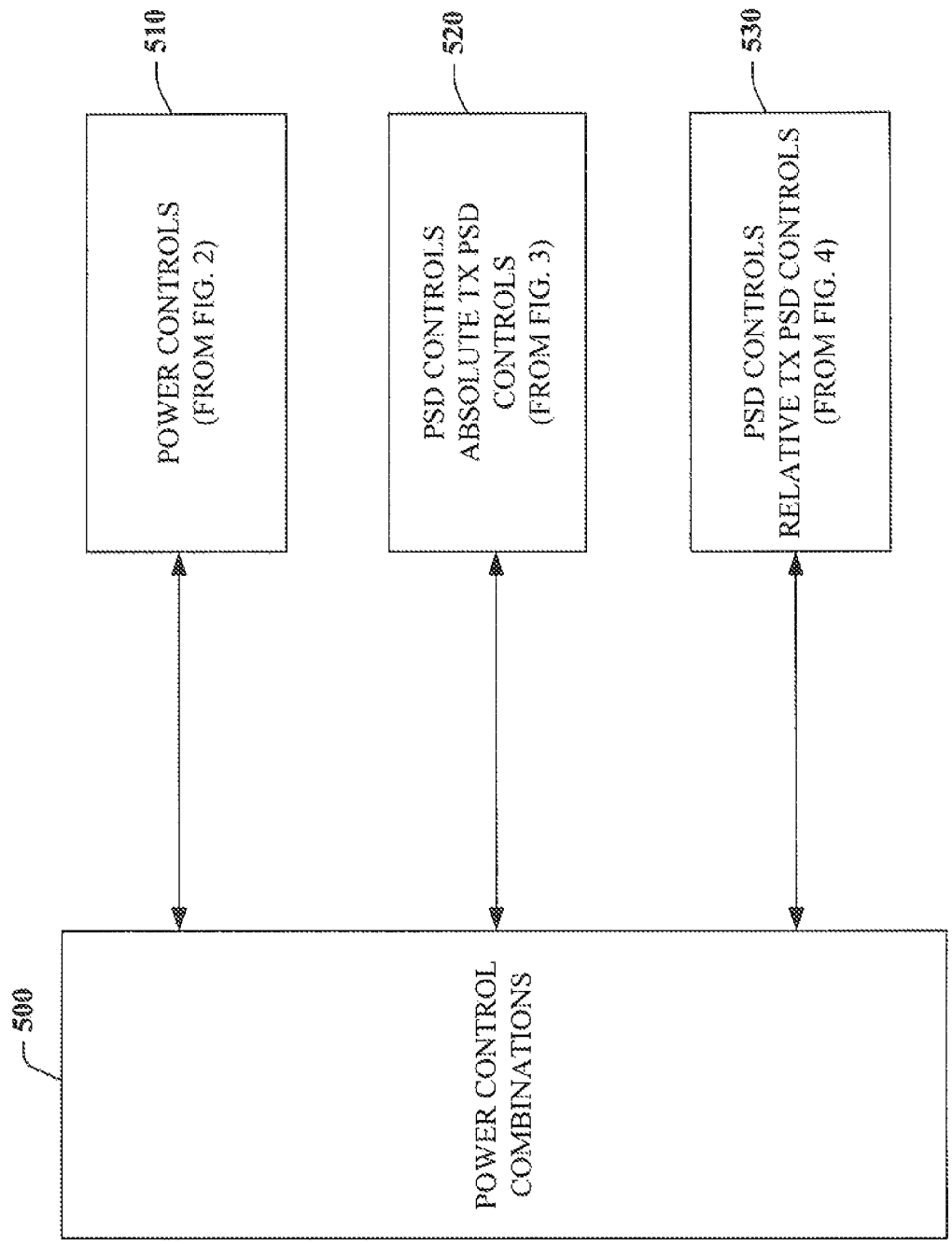
FIG. 5 is a diagram illustrating combinations of power control components.

FIGS. 2, 3, and 4 illustrate power control processes and power spectral density control processes for wireless systems. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

FIG. 2 illustrates a power control process 200 for a wireless system, where the process can be implemented as algorithm if desired. Proceeding to 210, a reference signal is maintained at a base station. In this case, a reference Signal-to-Noise-Ratio (SNR) is maintained at the base station or Node-B based on a periodically transmitted signal and/or based on Quality of Service (QoS) of transmitted traffic. At 220, the user equipment (UE) or device periodically reports a power headroom parameter based on the reference signal transmit (Tx) power. Generally, the power headroom is a function of the UE maximum Tx power and any load indication commands decoded from the other non-serving cells. At 230, the base station grants an uplink assignment to the UE. For instance, a Node-B grants an uplink assignment which can include the following information:

a. Bandwidth;
   i. Number of tones
b. Packet format
   i. Packet size and modulation At 240, the UE transmits the formatted packet in accordance with the assignment at 230 with the indicated maximum transmit power. The following example equations are provided to illustrate more detail with respect to the process 200.

The following notations can apply:

$P_{ref}(i,t)$=Reference Tx power for UE i at time t $W_{ref}$=Reference bandwidth $P_{max}(i)$=Maximum Tx power for UE i based on UE capability $P_{max}(i,t)$=Maximum allowed Tx power for UE i at time t $\Delta(i,t)$=Maximum supportable Tx power headroom for $$UE\ i = 10 * \log_{10}\left[\frac{P_{max}(i,t)}{P_{ref}(i,t)}\right]$$

L(i,t)=Effective load indicator command for UE i at time t $f(\cdot)$=Function to map load indicator command to Tx power reduction (dB)

$g(\cdot)$=Function to take previous and current reference power into account (dB)

$E_{s,i}$=Rx energy per modulation symbol for user i $N_t$=Thermal plus other interference PSD where the UE reports:

$$\Delta(i,t)=\Delta(i,t-1)-f(L(i,t)+g(P_{ref}(i,t),P_{ref}(i,t-1))$$

Assuming that the UE transmits with constrained power on the reference bandwidth, the maximum SNR per modulation symbol can be written as:

$$\left(\frac{E_{s,i}}{N_t}\right)_{max} = \left(\frac{E_{s,i}}{N_t}\right)_{ref} + \Delta(i,t)$$

The scheduler at the station or Node B can now flexibly allocate bandwidth to different users where:

$W_{assign}(i)$ = Assigned bandwidth for UE $i$ $TF_{assign}(i)$ = Assigned transport format for UE $i$ $$\left(\frac{E_{s,i}}{N_t}\right)_{assign} \leq \left(\frac{E_{s,i}}{N_t}\right)_{max} + 10 * \log_{10}\left[\frac{W_{ref}}{W_{assign}(i)}\right]$$

Thus, each assigned user transmits data at the power level given by:

$$P_{assigned}(i) \leq P_{ref}(i,t) \cdot 10^{\Delta(i,t)/10} = P_{max}(i,t) \cdot 10^{-f(L(i,t))/10}$$

FIG. 3 illustrates a power spectral density (PSD) control process 300 for wireless networks. Similar, to the process 200 above, the process 300 includes maintaining a reference signal at the base station at 310. In contrast to the process 300, there is a variation in control at 320 that involves the UE reporting an additional variable, namely, the maximum allowed Tx power given as:

$$P_{max}(i,t) \cdot 10^{-f(L(i,t))/10}$$

With the additional information of maximum allowed Tx power, the base station or Node-B can control both the Tx PSD and the receiver (Rx) SNR from each scheduled user. Generally, acts 330 and 340 are similar to the process 200 described above. Namely, at 330, the base station grants an uplink assignment to the UE which can include bandwidth and a packet format as previously described. At 340, the UE transmits the formatted packet in accordance with the assignment at 330 with the indicated maximum transmit power and the additional parameter of maximum allowed transmit power.

FIG. 4 illustrates a relative power spectral density PSD) control process 400 for a wireless network. At 410, a reference PSD is maintained at a base station or Node-B based on a periodically transmitted signal and/or based on QoS of transmitted traffic. At 420, the UE periodically reports the reference PSD delta and an associated bandwidth, where the Tx PSD is a function of the reference PSD and any load indication commands decoded from the other non-serving cells; and the associated bandwidth is computed from the maximum transmit power and the Tx PSD. At 430, the base station or Node-B grants an uplink assignment including the following information:
  a. Bandwidth
    i. Number of tones
  b. Packet format
    i. Packet size and modulation At 440, the UE transmits the packet in accordance with the assignment with the Tx PSD. The following example equations are provided to illustrate more detail with respect to the process 400.

The following notations can apply:
$\Phi_{ref}(i)$=Reference PSD for UE $i$
$\Phi_{tx}(i)$=Tx PSD for UE $i$
$\Delta_{psd}(i,t)$=Reference PSD boost (dB) for UE $i$ at time $t$
$W_{tx}(i)$=Associated Tx bandwidth for UE $i$ The UE reports:

$$\Delta_{psd}(i, t) = \Delta_{psd}(i, t-1) - f(L_{i,t}) + g(P_{ref}(i, t), P_{ref}(i, t-1))$$

$$W_{tx}(i) = \frac{P_{max}(i)}{\Phi_{tx}(i)}$$

wherein:

$$\Phi_{tx}(i) = \frac{P_{ref}(i)}{W_{ref}} \cdot 10^{\Delta_{psd}(i,t)/10}$$

The reference PSD is defined as:

$$\Phi_{ref}(i) = \frac{P_{ref}(i)}{W_{ref}}$$

The scheduler uses the following criteria to allocate bandwidth to different users with the following constraint:

$W_{assign}(i)$=Assigned bandwidth for UE $i \leq W_{tx}(i)$

Thus, each assigned UE sets its transmit PSD to $\Phi_{tx}(i)$ and transmits data at the power level given by:

$$P_{assigned}(i) = \Phi_{tx}(i) \cdot W_{assign}(i) \leq P_{max}(i)$$

It is noted that the base station or Node-B does not control the absolute value of the Tx PSD from each UE. Instead, it controls the difference in Tx PSD from the reference PSD. More details regarding differences between power control, absolute power spectral density control, and relative power spectral density control will be described below with respect to FIG. 6.

FIG. 5, power control component combinations 500 are illustrated. In this embodiment, it is shown that various combinations of control algorithms can be implemented or dynamically selected between respective base stations and associated user devices or equipment. At 510, power controls are shown and are generally related to the processes depicted in FIG. 2. At 520, power controls employ absolute transmit power spectral density (PSD) controls as depicted in FIG. 3, and at 530, PSD controls are provided that employ relative transmitter PSD controls. Thus, in one case, it is possible to employ a single component such as the power controls 510. In another example, the power controls 510 and the power controls 520 may be utilized. In still yet another example, power controls 510, 520, and 530 may be employed concurrently to reduce user device power and mitigate interference in the wireless network or across networks. As can be appreciated, various combinations of the components 510, 520, and 530 can be employed at different times or according to different applications.

Figure 6:
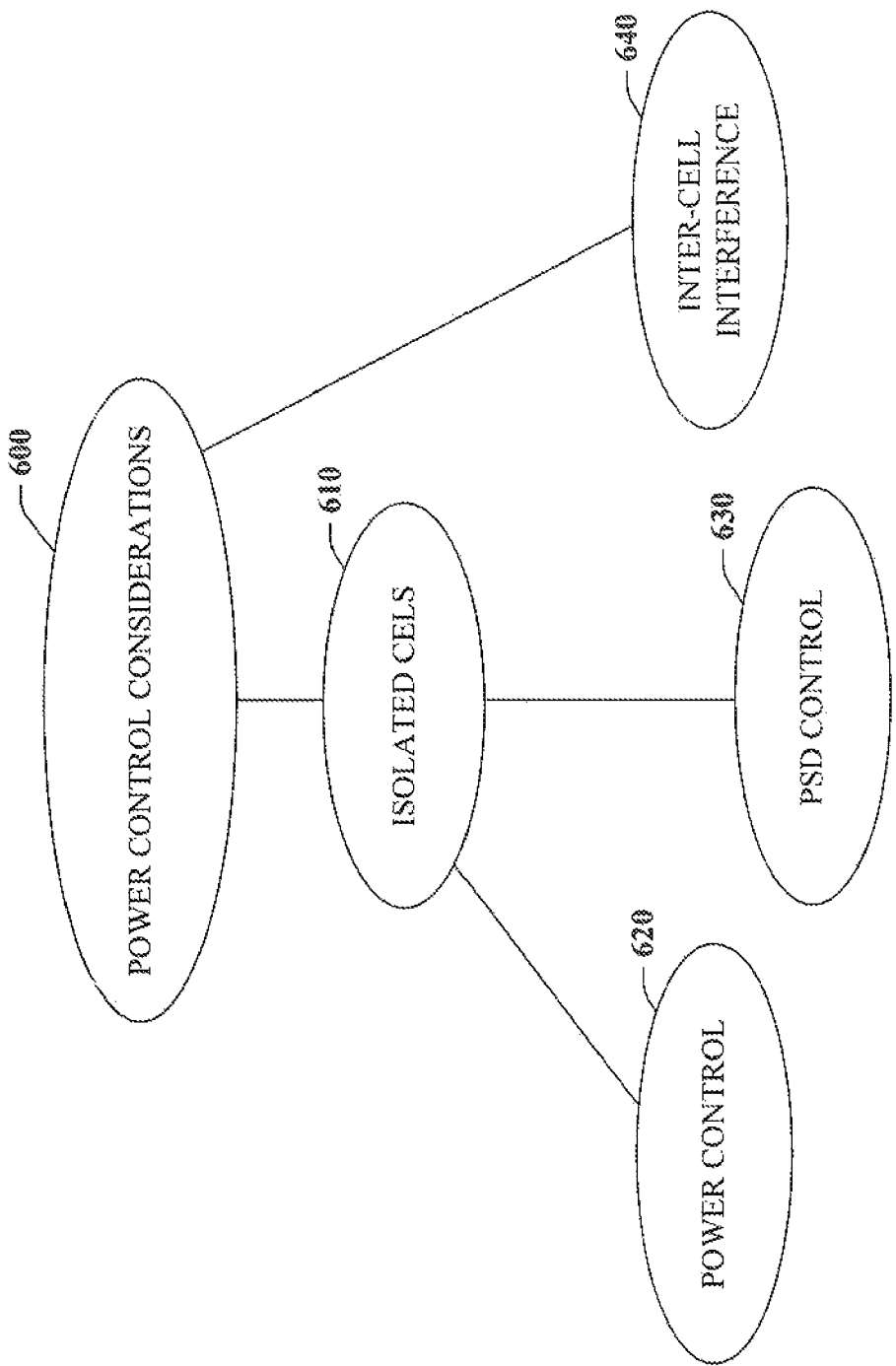
FIG. 6 is a diagram illustrating power control and power spectral density control considerations for wireless networks.

FIG. 6 illustrates power control and power spectral density control considerations 600 for wireless networks. It is noted that:

The process or algorithm 200 controls the relative UE Tx power;

The process or algorithm 300 controls the relative UE Tx power and the absolute Tx PSD; and The process or algorithm 400 controls the relative UE Tx PSD. In the following description, differences between these respective process are analyzed.

Without loss in generality, it can be assumed that the reference Rx SNR for all users is approximately the same (e.g., same channel, same erasure/error rate). In a typical scenario, this need not be the case and the Rx SNR can vary as a function of the exact channel. Further, it can be assumed that the maximum Tx power of each UE is the same (e.g., same UE class across the network). At 610, isolated cells are considered where power control differences are considered at 620 for isolated cell. The following provides an example analysis for power control 620:

In process 200 above, each UE reports:

$$\Delta(i, t) = 10 * \log_{10}\left[\frac{P_{max}(i, t)}{P_{ref}(i, t)}\right]$$

and the uplink assignment is such that:

$$\left(\frac{E_{s,i}}{N_t}\right)_{assign} \le \left(\frac{E_{s,i}}{N_t}\right)_{ref} + \Delta(i, t) + 10 \cdot \log_{10}\left[\frac{W_{ref}}{W_{assign}(i)}\right]$$

Each assigned user transmits data at the power level given by:

$$P_{assigned}(i) \le P_{ref}(i,t) \cdot 10^{\Delta(i,t)/10} = P_{max}(i,t)$$

Therefore, each user could transmit at current maximum allowed power. However, the user specific Tx PSD varies depending upon the bandwidth allocation and can be tightly controlled if the process 300 is employed.

At 630 of FIG. 6, PSD differences are considered where the following example analysis is provided:

In the PSD control algorithm, each UE reports:

$$\Delta_{pxd}(i, t) \text{ and } W_{tx}(i) = \frac{P_{max}}{\Phi_\alpha(i)}$$

The uplink assignment is such that:

$$P_{assigned}(i) = \Phi_{tx}(i) \cdot W_{assign}(i) = \frac{P_{max}}{W_{tx}(i)} \cdot W_{assign}(i)$$

$$W_{assign}(i) \le W_{tx}(i)$$

$$\Rightarrow P_{assigned}(i) \le P_{max}$$

The equality holds if and only if:

$$W_{assign}(i) = W_{tx}(i)$$

Thus, the UE does not transmit at maximum power, unless it is assigned the transmit bandwidth that it reported to the scheduler associated with the base station.

At 640 of FIG. 6, inter-cell interference is considered where the following example analysis can apply:

The transmit PSD from a UE when process 200 or 300 is applied can be written as:

$$\Phi_{tx}(i) = \frac{P_{assign}(i)}{W_{assign}(i)}$$

$$= \frac{P_{max}}{W_{assign}(i)} \cdot 10^{-f(t(i,t))/10}$$

The transmit PSD from a UE when process 400 is applied can be written as:

$$\Phi_{tx}(i) = \frac{P_{ref}(i)}{W_{ref}} \cdot 10^{\Delta_{pxd}(i,t)/10} \cdot 10^{-f(L(i,t))/10}$$

Generally, both schemes result in identical PSD if:

$$\Delta_{pxd}(i, t) = 10 * \log_{10}\left[\frac{P_{max}(i, t)}{P_{ref}(i, t)}\right] + 10 * \log_{10}\left[\frac{W_{ref}}{W_{assign}(i)}\right]$$

However, the process 200 or 300 place no UE explicit restriction on the choice of the assignment bandwidth, whereas in process 400:

$$W_{assign}(i) \le \frac{P_{max}}{\Phi_{tx}(i)}$$

Generally, process 300 controls both UE Tx power and PSD, and does not place any restriction on the Node-B's choice of bandwidth assignment. The uplink feedback overhead is similar in process or algorithms 300 and 400, and is smaller for algorithm or process 200.

Figure 7:
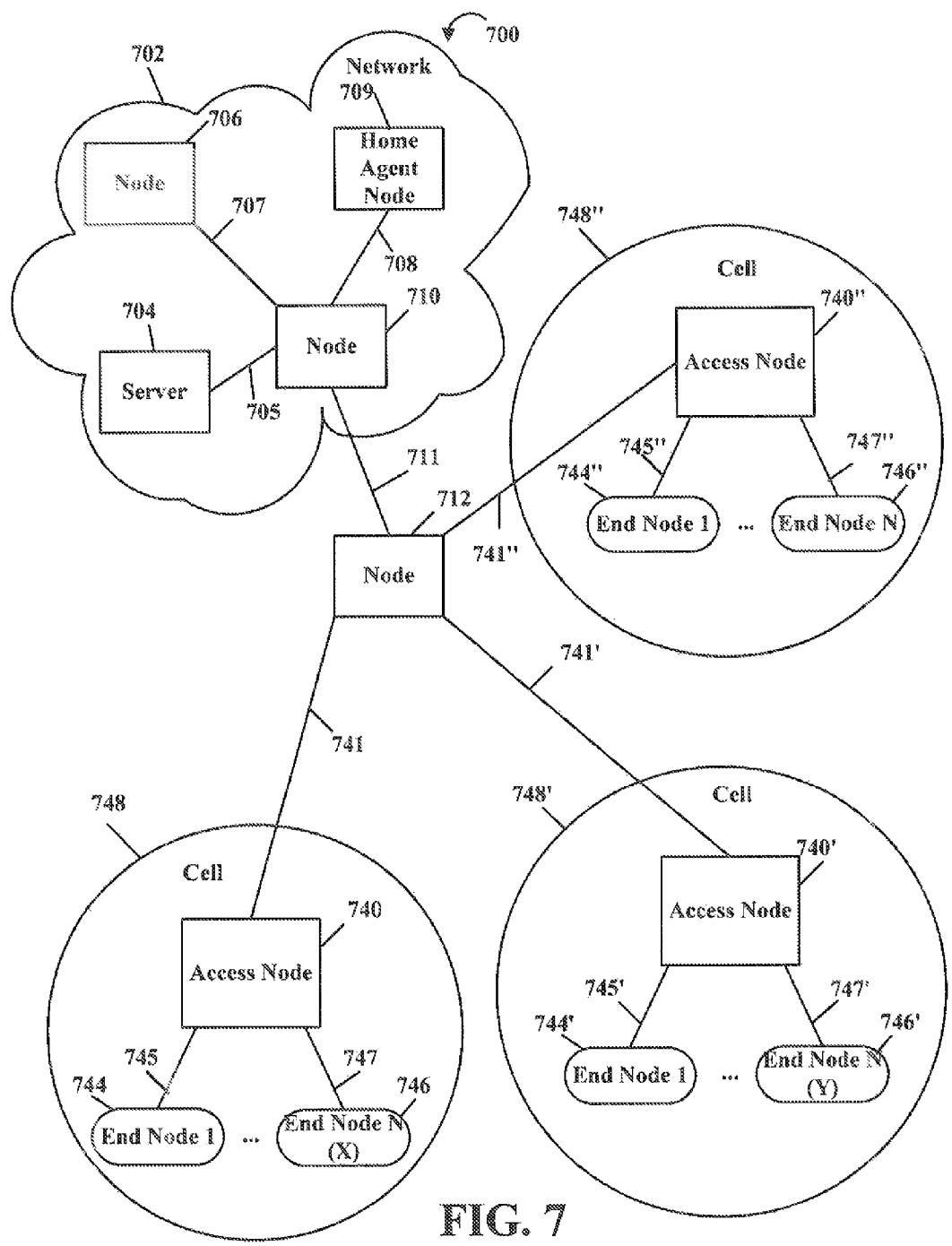
FIG. 7 is an illustration of an exemplary communication system (e.g., a cellular communication network) implemented in accordance with various aspects.

With reference to FIG. 7, illustrated is an exemplary communication system 700 (e.g., a cellular communication network) implemented in accordance with various aspects, which comprises a plurality of nodes interconnected by communications links. Nodes in exemplary communication system 700 exchange information using signals (e.g., messages) based on communication protocols (e.g., the Internet Protocol (IP)). The communications links of system 700 may be implemented, for example, using wires, fiber optic cables, and/or wireless communications techniques. Exemplary communication system 700 includes a plurality of end nodes 744, 746, 744', 746', 744", 746", which access communication system 700 via a plurality of access nodes 740, 740', and 740". End nodes 744, 746, 744', 746', 744", 746" may be, e.g., wireless communication devices or terminals, and access nodes 740, 740', 740" may be, e.g., wireless access routers or base stations. Exemplary communication system 700 also includes a number of other nodes 704, 706, 709, 710, and 712, used to provide interconnectivity or to provide specific services or functions. Specifically, exemplary communication system 700 includes a Server 704 used to support transfer and storage of state pertaining to end nodes. The Server node 704 may be an AAA server, a Context Transfer Server, a server including both AAA server functionality and Context Transfer server functionality.

Exemplary communication system 700 depicts a network 702 that includes Server 704, node 706 and a home agent node 709, which are connected to an intermediate network node 710 by corresponding network links 705, 707 and 708, respectively. Intermediate network node 710 in network 702 also provides interconnectivity to network nodes that are external from the perspective of network 702 via network link 711. Network link 711 is connected to another intermediate network node 712, which provides further connectivity to a plurality of access nodes 740, 740', 740" via network links 741, 741', 741", respectively.

Each access node 740, 740', 740" is depicted as providing connectivity to a plurality of N end nodes (744, 746), (744', 746'), (744", 746") respectively, via corresponding access links (745, 747), (745', 747'), (745", 747"), respectively. In exemplary communication system 700, each access node 740, 740', 740" is depicted as using wireless technology (e.g., wireless access links) to provide access. A radio coverage area (e.g., communications cells 748, 748', and 748") of each access node 740, 740', 740", respectively, is illustrated as a circle surrounding the corresponding access node.

Exemplary communication system 700 is presented as a basis for the description of various aspects set forth herein. Further, various disparate network topologies are intended to fall within the scope of the claimed subject matter, where the number and type of network nodes, the number and type of access nodes, the number and type of end nodes, the number and type of Servers and other Agents, the number and type of links, and the interconnectivity between nodes may differ from that of exemplary communication system 700 depicted in FIG. 7. Additionally, functional entities depicted in exemplary communication system 100 may be omitted or combined. Also, the location or placement of the functional entities in the network may be varied.

Figure 8:
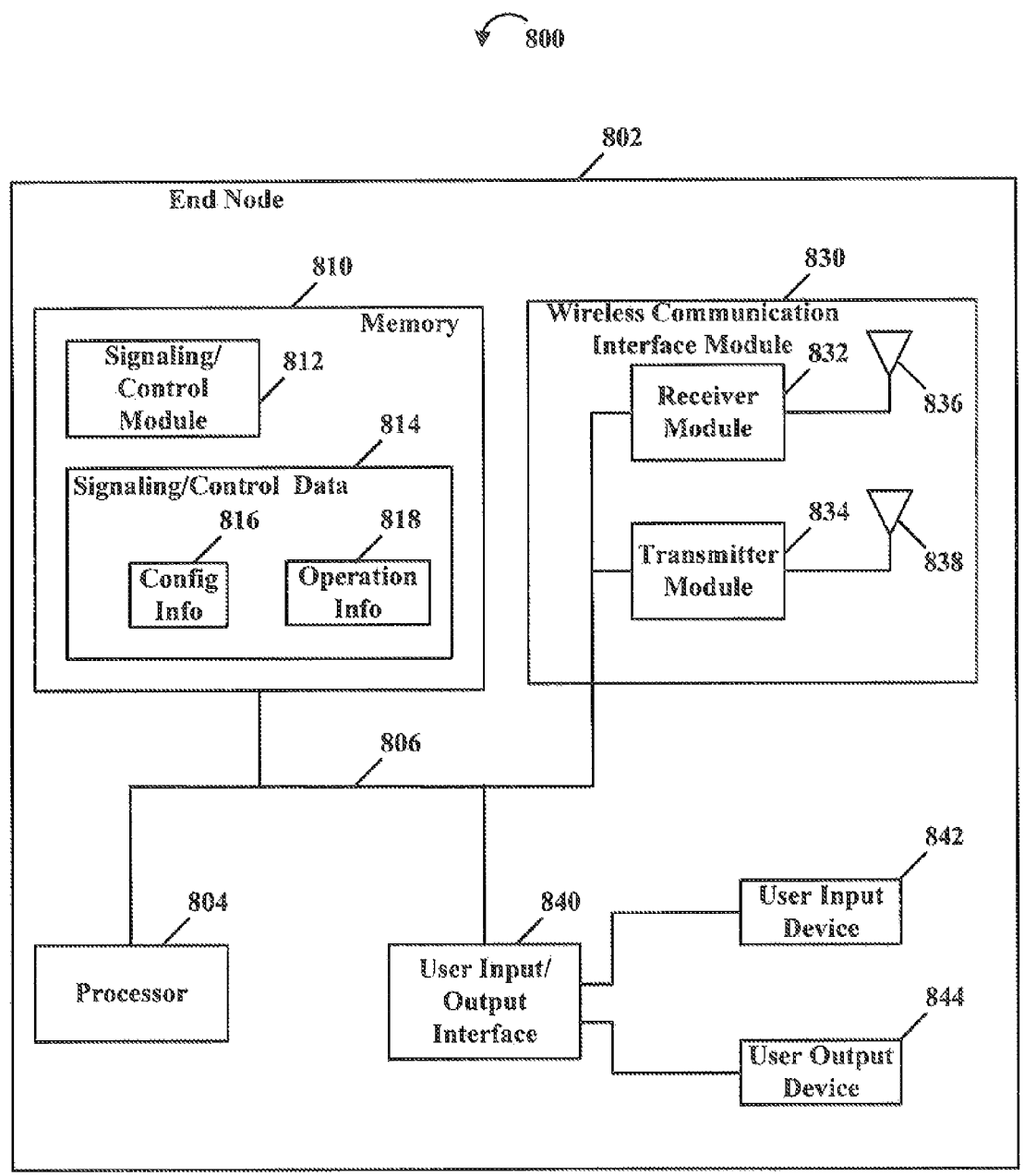
FIG. 8 is an illustration of an exemplary end node (e.g., a mobile node) associated with various aspects.

FIG. 8 illustrates an exemplary end node 800 (e.g., a mobile node) associated with various aspects. Exemplary end node 800 may be an apparatus that may be used as any one of the end nodes 744, 746, 744', 746', 744", 746" depicted in FIG. 7. As depicted, end node 800 includes a processor 804, a wireless communication interface 830 a user input/output interface 840 and memory 810 coupled together by a bus 806. Accordingly, various components of end node 800 can exchange information, signals a data via bus 806. Components 804, 806, 810, 830, 840 of end node 800 may be located inside a housing 802.

Wireless communication interface 830 provides a mechanism by which the internal components of the end node 800 can send and receive signals to/from external devices and network nodes (e.g., access nodes). Wireless communication interface 830 includes, for example, a receiver module 832 with a corresponding receiving antenna 836 and a transmitter module 834 with a corresponding transmitting antenna 838 used for coupling end node 800 to other network nodes (e.g., via wireless communications channels).

Exemplary end node 800 also includes a user input device 842 (e.g., keypad) and a user output device 844 (e.g., display), which are coupled to bus 806 via user input/output interface 840. Thus, user input device 842 and user output device 844 can exchange information, signals and data with other components of end node 800 via user input/output interface 840 and bus 806. User input/output interface 840 and associated devices (e.g., user input device 842, user output device 844) provide a mechanism by which a user can operate end node 800 to accomplish various tasks. In particular, user input device 842 and user output device 844 provide functionality that allows a user to control end node 800 and applications (e.g., modules, programs, routines, functions, etc.) that execute in memory 810 of end node 800.

Processor 804 may be under control of various modules (e.g., routines) included in memory 810 and may control operation of end node 800 to perform various signaling and processing as described herein. The modules included in memory 810 are executed on startup or as called by other modules. Modules may exchange data, information, and signals when executed. Modules may also share data and information when executed. Memory 810 of end node 800 may include a signaling/control module 812 and signaling/control data 814.

Signaling/control module 812 controls processing relating to receiving and sending signals (e.g., messages) for management of state information storage, retrieval, and processing. Signaling/control data 814 includes state information such as, for instance, parameters, status, and/or other information relating to operation of the end node. In particular, signaling/control data 814 may include configuration information 816 (e.g., end node identification information) and operational information 818 (e.g., information about current processing state, status of pending responses, etc.). Signaling/control module 812 may access and/or modify signaling/control data 814 (e.g., update configuration information 816 and/or operational information 818).

Figure 9:
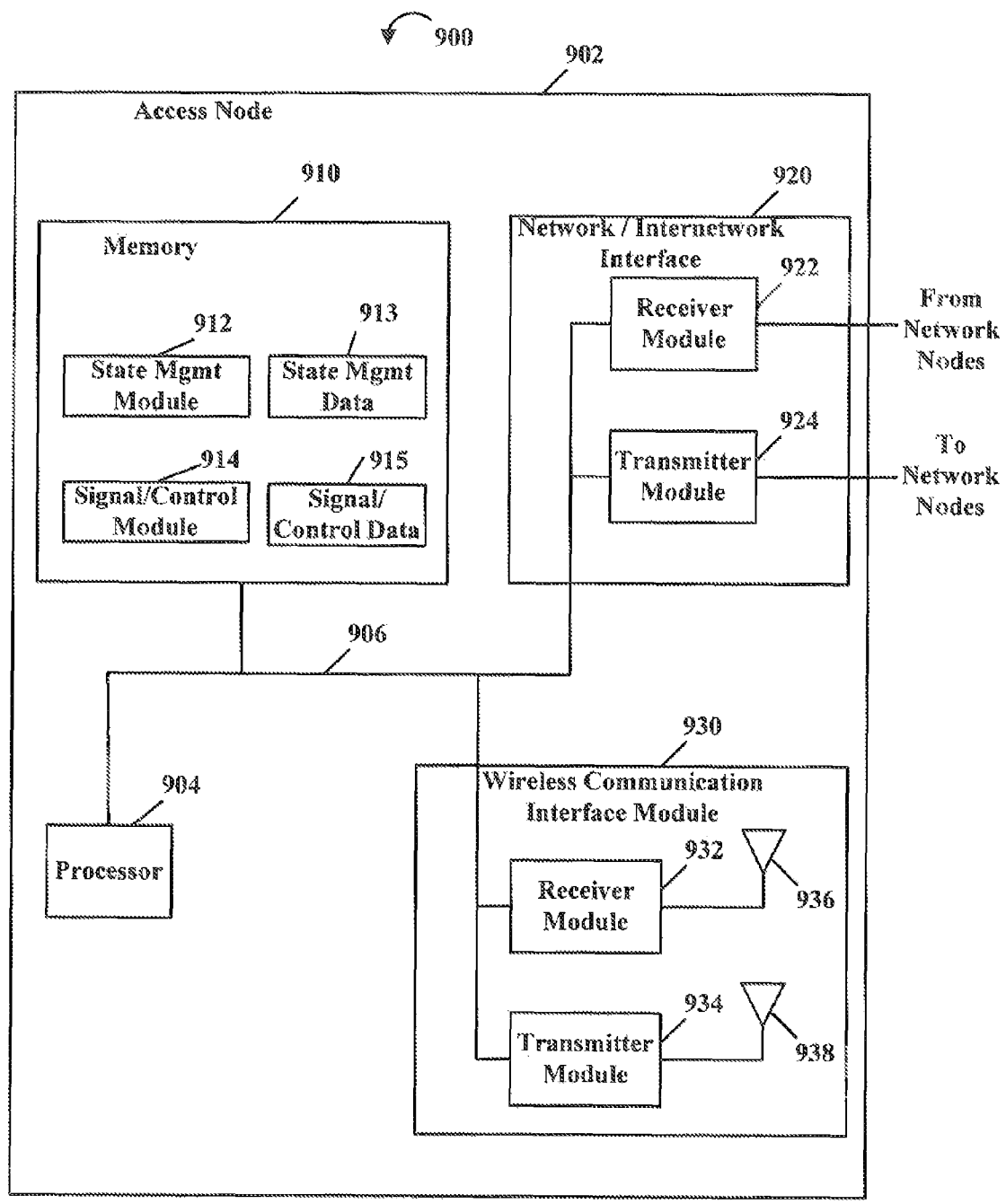
FIG. 9 is an illustration of an exemplary access node implemented in accordance with various aspects described herein.

FIG. 9 provides an illustration of an exemplary access node 900 implemented in accordance with various aspects described herein. Exemplary access node 900 may be an apparatus utilized as any one of access nodes 740, 740', 740" depicted in FIG. 7. Access node 900 includes a processor 904, memory 910, a network/internetwork interface 920 and a wireless communication interface 930, coupled together by a bus 906. Accordingly, various components of access node 900 can exchange information, signals and data via bus 906. The components 904, 906, 910, 920, 930 of the access node 900 may be located inside a housing 902.

Network/internetwork interface 920 provides a mechanism by which the internal components of access node 900 can send and receive signals to/from external devices and network nodes. Network/internetwork interface 920 includes a receiver module 922 and a transmitter module 924 used for coupling access node 900 to other network nodes (e.g., via copper wires or fiber optic lines). Wireless communication interface 930 also provides a mechanism by which the internal components of access node 900 can send and receive signals to/from external devices and network nodes (e.g., end nodes). Wireless communication interface 930 includes, for instance, a receiver module 932 with a corresponding receiving antenna 936 and a transmitter module 934 with a corresponding transmitting antenna 938. Wireless communication interface 930 may be used for coupling access node 900 to other network nodes (e.g., via wireless communication channels).

Processor 904 under control of various modules (e.g., routines) included in memory 910 controls operation of access node 900 to perform various signaling and processing. The modules included in memory 910 may be executed on startup or as called by other modules that may be present in memory 910. Modules may exchange data, information, and signals when executed. Modules may also share data and information when executed. By way of example, memory 910 of access node 900 may include a State Management module 912 and a Signaling/Control module 914. Corresponding to each of these modules, memory 910 also includes State Management data 913 and the Signaling/Control data 915.

State Management Module 912 controls the processing of received signals from end nodes or other network nodes regarding state storage and retrieval. State Management Data 913 includes, for instance, end-node related information such as the state or part of the state, or the location of the current end node state if stored in some other network node. State Management module 912 may access and/or modify State Management data 913.

Signaling/Control module 914 controls the processing of signals to/from end nodes over wireless communication interface 930 and to/from other network nodes over network/internetwork interface 920 as necessary for other operations such as basic wireless function, network management, etc. Signaling/Control data 915 includes, for example, end-node related data regarding wireless channel assignment for basic operation, and other network-related data such as the address of support/management servers, configuration information for basic network communications. Signaling/Control module 914 may access and/or modify Signaling/Control data 915.

It is noted, that for a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 10:
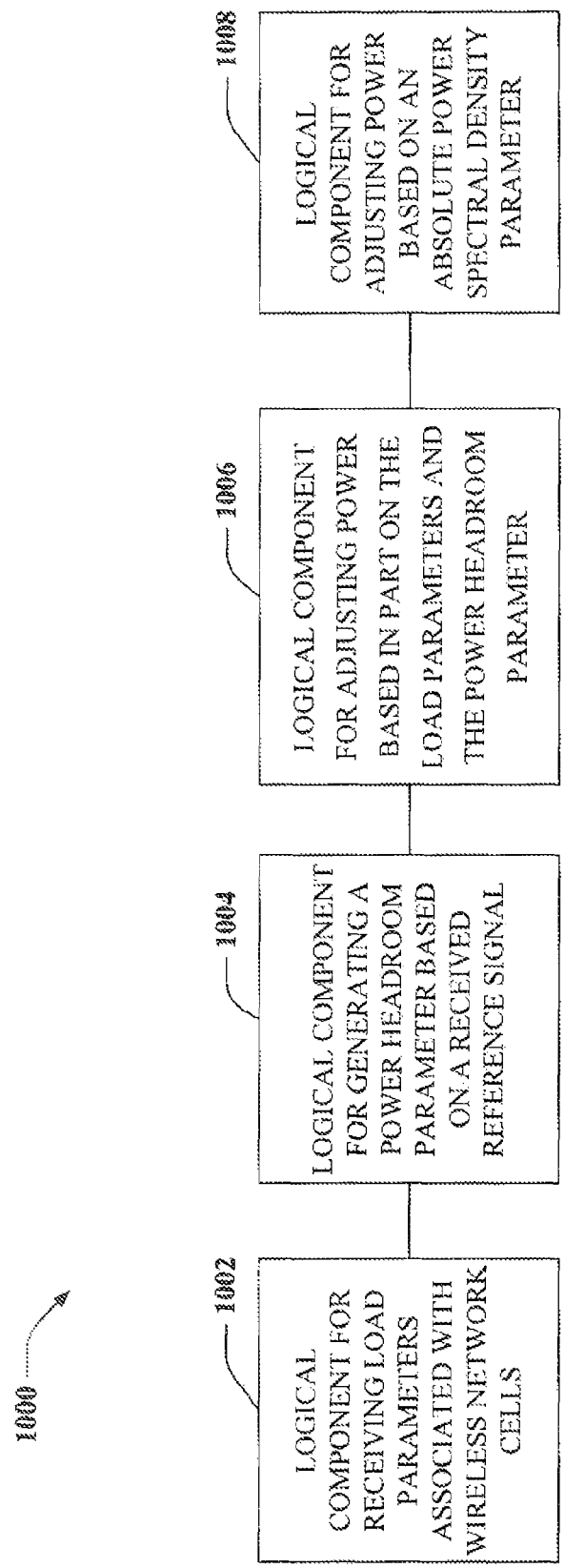
FIG. 10 is an illustration of a system for controlling power in accordance with a wireless terminal.

FIG. 10 is an illustration of a system 1000 for controlling power in accordance with a wireless terminal. In general, the system 1000 is related to a wireless communications apparatus to control transmitted power. This includes a logical component 1002 for receiving load parameters associated with wireless network cells. For example, this could include a receiver circuit in a wireless terminal or other receiver components. At 1004, a logical component is provided for generating a power headroom parameter based on a received reference signal. This could include a processor associated with a wireless terminal. At 1006, a logical component is provided for adjusting power based in part on the load parameters and the power headroom parameter. This can include processor instructions or hardware to execute a power control algorithm for example. At 1008, a logical component is provided for adjusting power based on an absolute power spectral density parameter, where this module can also include components of an algorithm.

Figure 11:
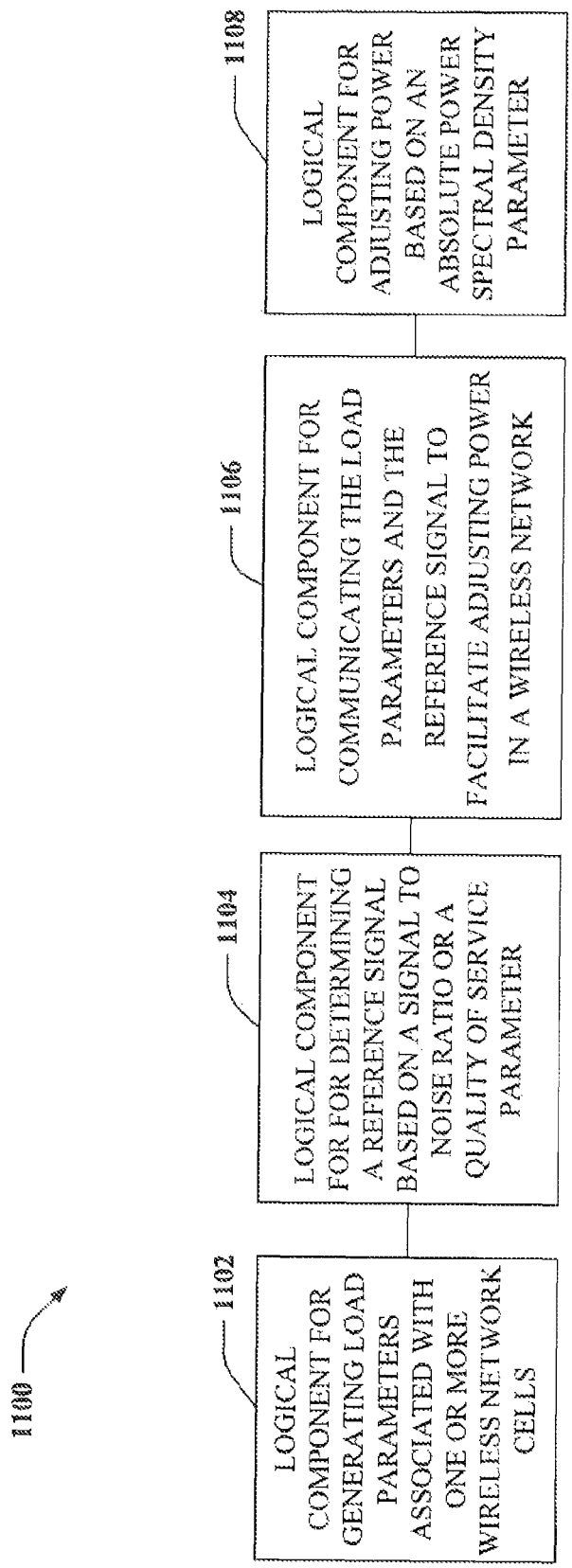
FIG. 11 is an illustration of a system for controlling power in accordance with a base station.

FIG. 11 is an illustration of a system 1100 for controlling power in accordance with a base station. The system 1100 relates to a wireless communications apparatus to control transmitted power and includes logical component 1102 for generating load parameters associated with one or more wireless network cells. This can include a base station transmitter for example. At 1104, a logical component is provided for determining a reference signal based on a signal to noise ratio (SNR) or a quality of service parameter (QoS). This can include a processor component at the base station to determine the reference signal, for example. At 1106, a logical component is provided for communicating the load parameters and the reference signal to facilitate adjusting power in a wireless network. This can include a memory for storing the parameters. At 1108, a logical component is provided for adjusting power based on an absolute power spectral density parameter. This can include a wireless terminal that adjusts its power based on such parameters.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for controlling power in a wireless network, comprising:
   determining a relative power parameter at a wireless device operating in a first wireless cell;
   receiving a load parameter at the wireless device, the load parameter associated with at least one other wireless cell within the same wireless network; and
   adjusting transmit power of the wireless device in view of the relative power parameter and the load parameter.

2. The method of claim 1, further comprising adjusting the transmit power in view of an absolute power spectral density parameter.

3. The method of claim 2, further comprising adjusting the transmit power in view of a relative power spectral density parameter.

4. The method of claim 1, the load parameter is associated with a data bit, the data bit associated with a wireless device in the at least one other wireless cell.

5. The method of claim 1, further comprising receiving a reference signal at the wireless device.

6. The method of claim 5, the reference signal is based on a signal to noise ratio (SNR) or a Quality of Service (QoS) parameter.

7. The method of claim 5, further comprising generating a power headroom parameter based on the reference signal.

8. The method of claim 1, further comprising receiving an uplink assignment for the wireless device, wherein the wireless device uses the transmit power for transmissions over the assigned uplink.

9. The method of claim 8, the uplink assignment includes bandwidth and packet information.

10. The method of claim 9, further comprising transmitting the packet information in accordance with an assignment and with an indicated maximum transmit power.

11. The method of claim 1, further comprising reporting information according to the following equation:

$$\Delta(i,t)=\Delta(i,t-1)-f(L(i,t)+g(P_{ref}(i,t),P_{ref}(i,t-1));$$

where User Equipment is UE and
$P_{ref}(i,t)$=Reference Tx power for UE i at time t
$W_{ref}$=Reference bandwidth
$P_{max}$=Maximum Tx power for UE i based on UE capability
$P_{max}(i,t)$=Maximum allowed Tx power for UE i at time t $$UE\, i = 10 * \log_{10}\left[\frac{P_{max}(i,t)}{P_{ref}(i,t)}\right]$$

$\Delta(i,t)$=Maximum supportable Tx power headroom for
$L(i,t)$=Effective load indicator command for UE i at time t
$f(\cdot)$=Function to map load indicator command to Tx power reduction (dB)
$g(\cdot)$=Function to take previous and current reference power into account (dB)
$E_{s,i}$=Rx energy per modulation symbol for user i
$N_t$=Thermal plus other interference PSD.

12. The method of claim 11, further comprising determining a maximum SNR per modulation symbol per the following equation:

$$\left(\frac{E_{s,t}}{N_t}\right)_{max} = \left(\frac{E_{s,t}}{N_t}\right)_{ref} + \Delta(i,t);$$

where $E_{s,j}$ = Rx energy per modulation symbol for user $i$ $N_t$ = Thermal plus other interference PSD.

13. The method of claim 12, further comprising allocating bandwidth according to the following equations:

$W_{assign}(i)$ = Assigned bandwidth for UE $i$ $TF_{assign}(i)$ = Assigned transport format for UE $i$ $$\left(\frac{E_{s,t}}{N_t}\right)_{assign} \leq \left(\frac{E_{s,t}}{N_t}\right)_{max} + 10*\log_{10}\left[\frac{W_{ref}}{W_{assign}(i)}\right]$$

where $W_{ref}$ = Reference bandwidth $E_{s,t}$ = Rx energy per modulation symbol for user $i$ $N_t$ = Thermal plus other interference PSD 14. The method of claim 13, further comprising at a power level given by the following equation:

$$P_{assigned}(i) \leq P_{ref}(i,t) \cdot 10^{\Delta(i,t)/10} = P_{max}(i,t) \cdot 10^{-f(L(i,t))/10}$$

15. The method of claim 13, further comprising generating a power parameter according to the following equation:

$$P_{max}(i,t) \cdot 10^{-f(L(i,t))/10}.$$

16. A machine readable medium having machine executable instructions stored thereon, comprising:
receiving one or more load bits at a wireless device relating to activity in at least a second wireless cell of a wireless network;
determining a relative power parameter based on a received reference signal; and
controlling power at the wireless device based in part on the load bits and the relative power parameter, wherein the wireless device operates in a first wireless cell of the wireless network.

17. The machine readable medium of claim 16, further comprising controlling power at the wireless device based on an absolute power spectral density parameter.

18. The machine readable medium of claim 17, further comprising controlling power at the wireless device based on a relative power spectral density parameter.

19. The machine readable medium of claim 16, wherein the power of the wireless device is controlled to mitigate interference in the at least second wireless cell.

20. A method for controlling power from a base station in a wireless network, comprising:
receiving a relative power parameter;
generating a load parameter from the base station in the wireless network, the load parameter associated with at least a second wireless cell; and
communicating across at least a first wireless cell of the wireless network from the base station according to power levels associated with the relative power parameter and the load parameter.

21. The method of claim 20, further comprising communicating across the wireless network in view of an absolute power spectral density parameter.

22. The method of claim 20, further comprising communicating across the wireless network in view of a relative power spectral density parameter.

23. The method of claim 20, the load parameter is associated with a data bit, the data bit associated with a wireless device in the at least one other wireless cell.

24. The method of claim 20, further comprising generating a reference signal for at least one wireless device.

25. The method of claim 24, the reference signal is based on a signal to noise ratio (SNR) or a Quality of Service (QoS) parameter.

26. A machine readable medium having machine executable instructions stored thereon, comprising:
generating one or more load bits relating to activity in at least a second wireless cell of a wireless network;
determining a relative power parameter based on a reference signal; and
communicating the load bits and the relative power parameter across the wireless network to facilitate power controls in a first wireless cell of the wireless network.

27. The machine readable medium of claim 26, further comprising controlling power based on an absolute power spectral density parameter.

28. A wireless device adapted for controlling power in a wireless network, comprising:
a wireless communication interface;
a processing circuit coupled to the wireless communication interface, the processing circuit adapted to:
determine a relative power parameter of the wireless device operating in a first wireless cell;
receive a load parameter at the wireless device, the load parameter associated with at least one other wireless cell within the same wireless network; and
adjust the transmit power of the wireless communication interface in view of the relative power parameter and the load parameter.

29. A base station adapted for controlling power in a wireless network, comprising:
a wireless communication interface for communicating within a first wireless cell of the wireless network comprising a plurality of wireless cells;
a processing circuit coupled to the wireless communication interface, the processing circuit adapted to:
receive a relative power parameter;
generate a load parameter from the base station in the wireless network, the load parameter associated with at least one other wireless cell of the wireless network; and
communicate across the wireless network from the base station according to power levels associated with the relative power parameter and the load parameter.

30. A method for controlling power in a wireless network, comprising:
receiving one or more load bits relating to activity in a second wireless cell of the wireless network;
determining a relative power parameter based on a received reference signal; and
controlling power at a wireless device based in part on the load bits and the relative power parameter, wherein the wireless device operates in a first wireless cell of the wireless network.

31. The method of claim 30, wherein controlling power at a wireless device based in part on the load bits mitigates interference in the at least the second wireless cell.

32. A wireless device adapted for controlling power in a wireless network, comprising:
a wireless communication interface for communicating over the wireless network, the wireless device operating within a first wireless cell of the wireless network;

a processing circuit coupled to the wireless communication interface, the processing circuit adapted to:
  receive one or more load bits at the wireless device relating to activity in at least one other wireless cell of the wireless network;
  determine a relative power parameter based on a received reference signal; and
  control power at the wireless communication interface based in part on the load bits and the relative power parameter.

33. The wireless device of claim 32, wherein the power of the wireless communication interface is controlled to mitigate interference in the at least one other wireless cell.

34. A method for controlling power in a wireless network, comprising:
  generating one or more load bits relating to activity in a plurality of wireless cells of the wireless network;
  determining a relative power parameter based on a reference signal; and
  communicating the load bits and the relative power parameter across the wireless network to facilitate power controls in a first wireless cell of the wireless network.

35. The method of claim 34, wherein facilitating power controls based on the load bits mitigates interference in at least another wireless cell in the wireless network.

36. A base station adapted for controlling power in a wireless network, comprising:
  a wireless communication interface;
  a processing circuit coupled to the wireless communication interface, the processing circuit adapted to:
    generate one or more load bits relating to activity in a plurality of wireless cells of the wireless network;
    determine a relative power parameter based on a reference signal; and
    communicate the load bits and the relative power parameter across the wireless network to facilitate power controls in a first wireless cell of the wireless network.

37. A wireless device adapted for contmlling power in a wireless network, comprising:
  means for determining a relative power parameter at the wireless device;
  means for receiving a load parameter at the wireless device, the load parameter associated with at least one other wireless cell; and
  means for adjusting transmit power of the wireless device in view of the relative power parameter and the load parameter.

38. A processor-readable medium having one or more instructions operational at a wireless device for controlling power in a wireless network, which when executed by at least one processor causes the processor to:
  determine a relative power parameter at the wireless device;
  receive a load parameter at the.wireless device, the load parameter associated with at least one other wireless cell; and
  adjust transmit power of the wireless device in view of the relative power parameter and the load parameter.

39. A base station adapted for controlling power in a wireless network, comprising:
  means for receiving a relative power parameter;
  means for generating a load parameter from the base station in the wireless network, the load parameter associated with at least one other wireless cell; and
  means for communicating across the wireless network from the base station according to power levels associated with the relative power parameter and the load parameter.

40. A processor-readable medium having one or more instructions operational at a base station for controlling power in a wireless network, which when executed by at least one processor causes the processor to:
  receive a relative power parameter;
  generate a load parameter from the base station in the wireless network, the load parameter associated with at least one other wireless cell; and
  communicate across the wireless network from the base station according to power levels associated with the relative power parameter and the load parameter.

41. A wireless device adapted for controlling power in a wireless network, comprising:
  means for receiving one or more load bits at a wireless device relating to activity in the wireless network;
  means for determining a relative power parameter based on a received reference signal; and
  means for controlling power at the wireless device based in part on the load bits and the relative power parameter.

42. A base station adapted for controlling power in a wireless network, comprising:
  means for generating one or more load bits relating to activity in the wireless network;
  means for determining a relative power parameter based on a reference signal; and
  means for communicating the load bits and the relative power parameter across the wireless network to facilitate power controls in the wireless network.

* * * * *

UNITED STATES PATENT AND TRADEMARK OFFICE
CERTIFICATE OF CORRECTION

PATENT NO. : 7,996,032 B2
APPLICATION NO. : 11/689962
DATED : August 9, 2011
INVENTOR(S) : Durga Prasad Malladi, Byoung-Hoon Kim and Xiaoxia Zhang It is certified that error appears in the above-identified patent and that said Letters Patent is hereby corrected as shown below:

Claim 37, column 17, line 41, after "wireless device" insert --operating in a first wireless cell--; and
column 17, line 44, after "wireless cell" insert --within the same wireless network--.

Claim 38, column 18, line 4, after "device" insert --operating in a first wireless cell--; and
column 18, line 7, after "cell" insert --within the same wireless network--.

Claim 39, column 18, line 15, replace "one other" with --a second--; and
column 18, line 16, after "means for communicating across" insert --at least a first wireless cell of--.

Claim 40, column 18, line 27, replace "one other" with --a second--; and
column 18, line 28, after "communicate across" insert --at least a first wireless cell of--.

Claim 41, column 18, line 34, after "activity in" insert --at least a second wireless cell of--; and
column 18, line 38, after "relative power parameter" insert --, wherein the wireless device operates in a first wireless cell of the wireless network--.

Claim 42, column 18, line 42, after "activity in" insert --at least a second wireless cell of--; and
column 18, line 47, after "power controls in" insert --a first wireless cell of--.

Signed and Sealed this
Twenty-fifth Day of October, 2011

David J. Kappos
*Director of the United States Patent and Trademark Office*